Figure 1:
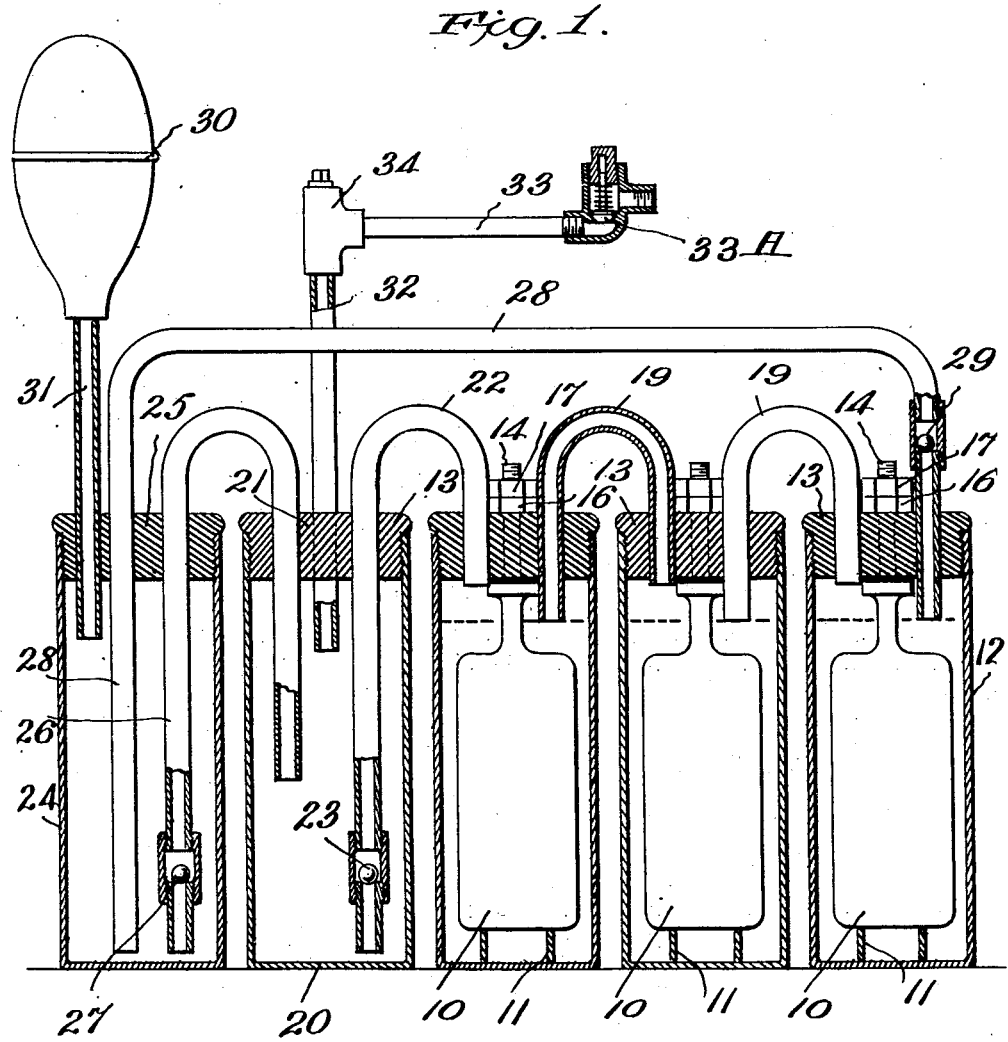

Nov. 11, 1930.   E. R. GILL   1,781,005
ELECTRIC BATTERY SYSTEM
Filed Aug. 7, 1925   2 Sheets-Sheet 2
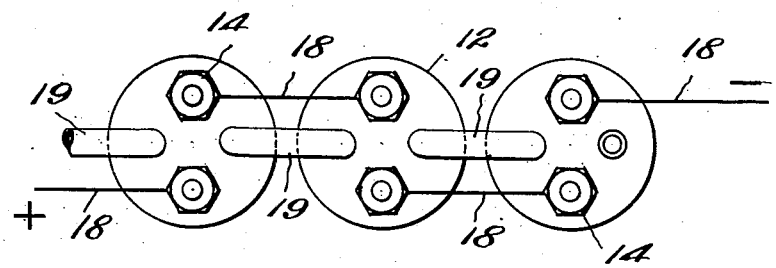
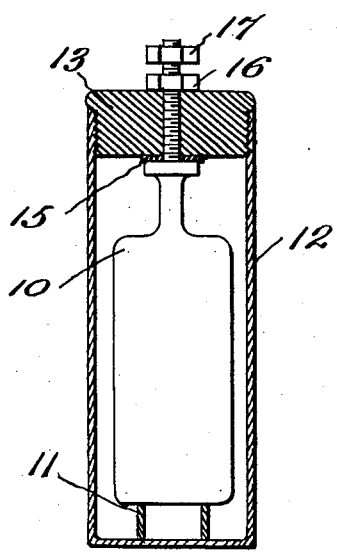 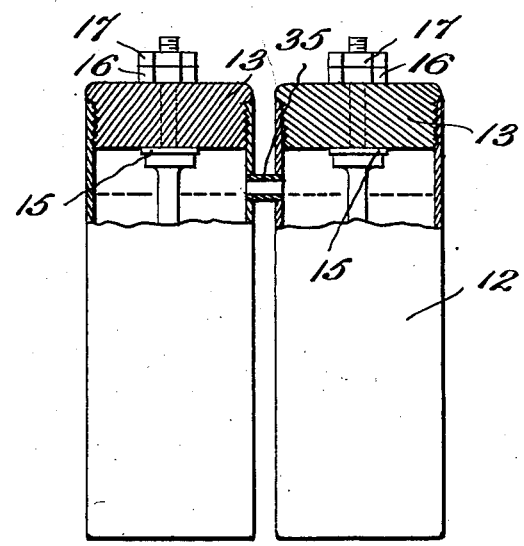

Patented Nov. 11, 1930

1,781,005

UNITED STATES PATENT OFFICE

EDWIN R. GILL, OF YONKERS, NEW YORK, ASSIGNOR TO E. R. GILL BATTERY CO., INC., OF NEW YORK, N. Y.

ELECTRIC BATTERY SYSTEM

Application filed August 7, 1925. Serial No. 48,711.

In my Letters Patent of the United States, for improvement in electric battery, No. 1,381,298, dated June 14, 1921, I have described and claimed a novel form of electric wet battery (primary or secondary) having a number of advantages, among which are simplicity in filling, automatic maintenance of level of liquid, and safe removal of gases given off.

The present invention has reference to an improved construction and arrangement of parts whereby all of the advantages of my aforesaid patented battery may be obtained together with certain other very important and novel advantages. At the same time my present invention does not depend upon the transfer of liquid from cell to cell by gravity. This fact makes it possible to store the entire battery within a space only just high enough to accommodate a single cell.

The principal advantages possessed by the present invention over my said patent and the prior art are as follows.

By the use of my invention a completely air tight, self-contained battery system is produced which cannot spill or spray acid or give off noxious gases, and wherein the level of liquid throughout the battery may be controlled at all times by a simple pneumatic controller without disturbing the battery in any way.

My novel battery system provides for a forward circulation of liquid and of gases in one direction, the liquid circulation returning upon itself.

My improved battery is not materially affected by jouncing or swaying to any extent. It may even be turned upside down, and, when again righted, any disturbances of liquid level, as between the cells, can be instantly corrected by a touch of the hand.

Primary or secondary batteries made in accordance with my invention have all the convenience and safety of dry cells, while retaining their great advantage over such cells in power, permanence and reliability.

Owing to safe disposition of gas and freedom from all spilling or spraying, my batteries can be compactly arranged within portable radio sets in close proximity to the delicate and sensitive elements used in the construction of such sets without danger of harming any of those elements.

Owing to the fact that my battery is not disturbed by swaying or inversion, it is especially well adapted for use in automobiles and aeroplanes, and on submarines or other vessels.

The invention is illustrated by way of example in the accompanying drawings wherein Figure 1 is a longitudinal vertical section of a three cell battery system embodying my invention, Figure 2 is a top plan view of the three cells, other parts not being shown, Figure 3 is a vertical sectional view taken through the sealing means for the stem of one battery plate, and Figure 4 is a sectional view of a modification.

In the particular form shown, the cells are storage battery, or secondary, cells, and one of the plates is shown at 10, resting upon the usual supports 11 at the bottom of the jar 12, in each cell.

The top of the jar is sealed air tight, as by a hard rubber plug 13, screwed into the top of the jar, and the stem 14 of each plate 10 extends up through this plug and through a soft rubber sealing pad 15. The nut 16 on the threaded end of the stem 14 compresses the pad 15 between the flange 17 and the plug 13, making a tight seal at this point. The nut 17 is used to secure the connecting wire 18 in the usual manner. The normal level of liquid within the cells is shown by the horizontal dotted lines.

In the preferred form shown in Figures 1 and 2 each cell is connected with the next by a bent tube 19, and this tube extends from about the normal liquid level of one cell to just under the bottom of the plug 13 in the next.

My improved battery system comprises, in addition to the battery cells, whatever their number, two operating chambers connected with the cells as shown.

At 20 is shown what may, for convenience, be termed the "filling chamber" which is sealed air tight by a plug 21, and has a tube 22 extending from near the bottom of 20 to just under the plug 13 in the nearest cell 12. An automatic valve 23 permits fluid to pass forward from the chamber 20 to the first cell 12, while preventing movement of fluid (either gas or liquid) in the backward or opposite direction.

The other operating chamber of the system is shown at 24, and may be conveniently termed the "overflow chamber". It is also closed by a tight plug 25, and has a tube 26 extending from near the bottom of 24 to (preferably) about the middle of the filling chamber 20. The valve 27, in the tube 26 has a function similar to that of the valve 23 in the tube 22.

Another tube 28 extends from near the bottom of the overflow chamber 24 to about the normal liquid level in the last cell 12 of the battery series. A valve 29 in this tube 28 (preferably just over the last cell 12) permits fluid to pass over into the overflow chamber, while preventing opposite movement of fluid.

Connected with the upper part of the chamber 24 is a pneumatic pressure-modifying device. This may comprise any means whereby the pneumatic pressure within the overflow chamber may be raised above or depressed below atmospheric pressure at will.

For many purposes this means may take the form of an ordinary hollow self-distending rubber bulb 30, connected with the interior of the chamber 24 by a tube 31, as shown in Figure 1.

From the top of the filling chamber 20 there extends a pipe 32 (preferably upright as shown) which communicates with any convenient gas discharge opening, as the pipe 33. By supplying a screw plug 34 at the top of the pipe 32, new water or other liquid may be fed into the filling chamber 20 from time to time, to replace that lost by electrolysis during the "gassing" of the battery.

In order to entirely cut off the battery system as a whole from the outer air I prefer to equip the pipe 33 with an automatic safety valve 33A. This will confine the gas that reaches the chambers 24 and 20 until it exceeds a predetermined pressure which is sufficient to open the valve 33A. This valve will of course close as soon as the extra pressure is relieved by escape of gas.

The original filling of the battery may, of course, be accomplished before the plugs 13 of the various cells 12 are screwed into place. If preferred, however, this filling may be accomplished through the tube 32; the bulb 30, or other source of pneumatic pressure, being used to force the liquid forward through the cells 12 successively. Owing to the arrangement of the valves 23, 27 and 29, each squeezing of the bulb 30 will force fluid forward through the system and each expansion or dilation of 30 will produce a vacuum which will suck fluid forward.

In this manner the cells will finally be filled to the level indicated by dotted lines, when it will begin to appear at the bottom of the tube 28 and will drop into the chamber 24. This will indicate that the cells are filled to the proper level, when the plug 34 can be screwed in and the whole system is sealed and ready for operation or, if desired the plug 34 may be dispensed with, in which case the safety valve 33A becomes unnecessary. The suction caused by dilation of bulb 30 is sufficient to cause a flow of liquid through the apparatus.

While the battery is charging, there will be energetic evolution of gas in every cell. Owing to the arrangement of the valves 23, 27 and 29 this gas is forced to find its way forward through the system, passing finally upward through the valve 29 and thence through 28, into the overflow chamber 24. A certain amount of liquid is carried over with this gas, and its appearance in the chamber 24 (which is preferably a glass jar) will indicate that the battery is being satisfactorily charged.

The gas thus received in the chamber 24, will, of course, pass by the tube 26 into the chamber 20, whence it is carried away by the pipes 32 and 33 to a point where it can do no harm.

During the charging of the battery, the disengagement of gas and the heating which accompanies the charging, will expand the liquid in every cell above the dotted line level shown. When the charging operation is completed, however, the liquid in each cell subsides to a level somewhat below that indicated in the drawing.

This makes it feasible to adopt in some cases the modified construction shown in Figure 4, wherein the tubes 19 are replaced by a straight passage 35, directly from cell to cell through the side, at about the normal liquid level. When the charging is over, the liquid will fall below the level of this opening or duct, and the electric leakage will become inappreciable. Such a duct may, of course, be a simple aperture through a wall common to the two contiguous cells, as shown for instance at 30 in Figure 2 or at 58 in Figure 6 of my aforesaid Patent Number 1,381,298.

After the battery is filled and in operation, it is clear that the equality of level in all the cells may always be insured by squeezing the bulb 30 a few times. The gassing due to discharge of the battery will cause a slow dropping of liquid into the bottom of the overflow chamber 24, and when this is observed to cease, it will be an indication that the level of liquid is getting low. A small quantity of water can then be added through the pipe 32, as already described, to compensate for the water destroyed by electrolysis and lost through gassing.

Since accidental disturbances of level can thus be easily corrected, it is clear that my improved system is especially adapted for use on vehicles and vessels which are subject to more or less swaying and shock. Indeed, even in the extreme case of an aeroplane turning upside down as in "looping the loop" or the like, my improved battery will be found to answer every requirement.

If my battery system, as shown, be turned upside down, the ball valves 23, 27 and 29 will be reversed and will act to prevent any liquid from leaving the cells 12, save such small amounts as may lodge in the tubes 19. When the battery is again righted, the return of these small quantities to the cells may not at once restore them all to a common level; but any small inequality thus produced can quickly be corrected by means of the bulb 30, in the manner already described.

Various changes may be made in the apparatus shown without departing from the broad scope of my invention, which is not limited to the details herein shown and described.

What I claim is—

1. A wet battery system, comprising a series of intercommunicating cells, a filling chamber connected by a fluid passage with one end of the series, an overflow chamber connected by a fluid passage with the opposite end of the series, and communicating means joining said overflow chamber with said filling chamber.

2. Apparatus as in claim 1 in combination with automatic valves for preventing back flow from said cells to the filling chamber and from the overflow chamber to said cells.

3. Apparatus as in claim 1 in combination with a gas escape pipe connected with said filling chamber.

4. Apparatus as in claim 1 in combination with means for varying the pneumatic pressure in the overflow chamber at will.

5. Apparatus as in claim 1 in combination with a self-distending pressure bulb and means connecting the same with the overflow chamber.

6. Apparatus as in claim 1 in combination with a gas escape pipe connected with the filling chamber and an automatic safety valve on the said escape pipe for controlling the pressure in the filling chamber.

7. In a wet battery filling system, a series of normally sealed battery cells, and means for filling each of said cells with liquid to a predetermined level, comprising a filling chamber, conduits for conveying liquid therefrom through each cell in series and back to the filling chamber in a closed path, the outlet of each cell being at the desired level, the inlet of each cell being at a substantially higher level than the outlet, and the conduits rising for a substantial distance as they leave each such outlet, and means for causing a flow of liquid from said filling chamber through each cell and back to the filling chamber.

8. In a wet battery filling system, a series of normally sealed battery cells, and means for filling each of said cells with liquid to a predetermined level, comprising a filling chamber, conduits for conveying liquid therefrom through each cell in series and back to the filling chamber in a closed path, the outlet for each cell being at the desired level, the inlet of each cell being at a substantially higher level than the outlet, and the conduits rising for a substantial distance as they leave each such outlet, and suction means for causing a flow of liquid from said filling chamber through each cell and back to the filling chamber.

9. In a wet battery filling system, a series of normally sealed battery cells, and means for filling each of said cells with liquid to a predetermined level, comprising a filling chamber, conduits for conveying liquid therefrom through each cell in series and back to the filling chamber in a closed path, the outlet of each cell being at the desired level, the inlet of each cell being at a substantially higher level than the outlet, and the conduits rising for a substantial distance as they leave each such outlet, pneumatic means for causing a flow of liquid from said filling chamber through each cell and back to the filling chamber, and valve means for preventing a flow of liquid in a reverse direction.

In testimony whereof I have hereto affixed my signature.

EDWIN R. GILL.